US012587419B2

(12) United States Patent
Chew et al.

(10) Patent No.: US 12,587,419 B2
(45) Date of Patent: Mar. 24, 2026

(54) CONSTANT ENVELOPE MODULATED UNITARY BRAID DIVISION MULTIPLEXING

(71) Applicant: Rampart Communications, Inc., Linthicum, MD (US)

(72) Inventors: Daniel W. Chew, Charles Town, WV (US); Sumant M. Pathak, Hanover, MD (US)

(73) Assignee: Rampart Communications, Inc., Linthicum Heights, MD (US)

( * ) Notice: Subject to any disclaimer, the term of this patent is extended or adjusted under 35 U.S.C. 154(b) by 0 days.

(21) Appl. No.: 18/679,660

(22) Filed: May 31, 2024

(65) Prior Publication Data
US 2025/0373475 A1    Dec. 4, 2025

(51) Int. Cl.
*H04L 27/12* (2006.01)
*H04L 1/00* (2006.01)
(52) U.S. Cl.
CPC ............ *H04L 27/12* (2013.01); *H04L 1/0033* (2013.01)

(58) Field of Classification Search
CPC ... H04L 27/0012; H04L 1/003; H04L 1/0031; H04L 27/0008; H04L 27/0002; H04L 27/00; H04L 1/0028; H04L 1/0032
See application file for complete search history.

(56) References Cited

U.S. PATENT DOCUMENTS

| | | |
|---|---|---|
| 10,020,839 B2 | 7/2018 | Palmisano et al. |
| 11,641,269 B2 | 5/2023 | Robinson |
| 11,936,770 B2 | 3/2024 | Robinson et al. |
| 2006/0094376 A1* | 5/2006 | Lee ........................... H03F 3/24 455/118 |
| 2024/0243768 A1* | 7/2024 | Velazquez ................ H04B 1/12 |

* cited by examiner

*Primary Examiner* — Khanh C Tran

(57) ABSTRACT
A transmitter may obtain a plurality of symbols encoding data to transmit wirelessly. A transmitter may transform the plurality of symbols using a unitary braid division multiplexing transform to produce a plurality of transformed symbols. A transmitter may scale the plurality of transformed symbols produce a plurality of scaled symbols. A transmitter may modulate a carrier signal by the plurality of scaled symbols to produce a constant envelope signal. A transmitter may transmit the modulated signal.

24 Claims, 5 Drawing Sheets

100

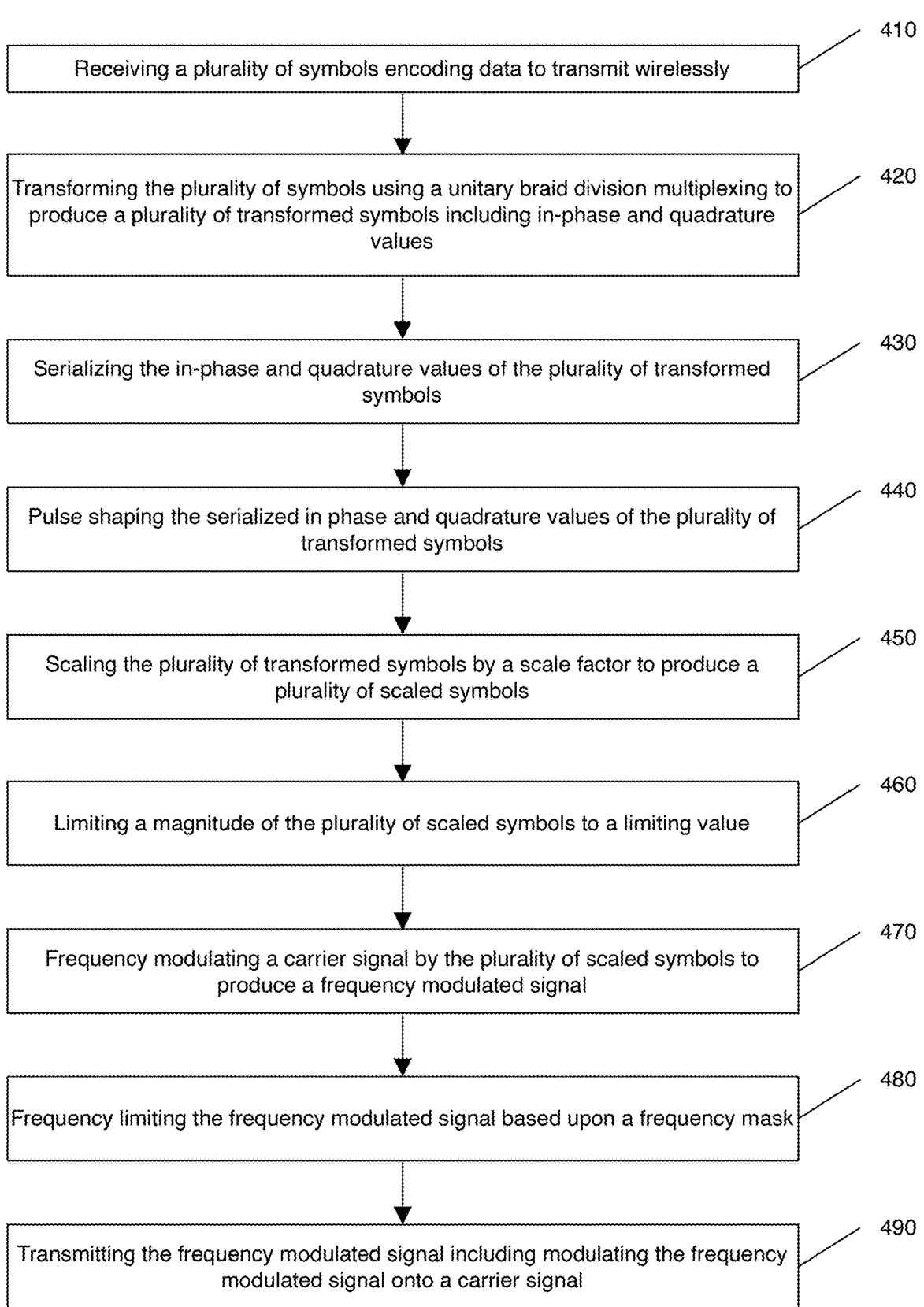

410 Receiving a plurality of symbols encoding data to transmit wirelessly

420 Transforming the plurality of symbols using a unitary braid division multiplexing to produce a plurality of transformed symbols including in-phase and quadrature values 430 Serializing the in-phase and quadrature values of the plurality of transformed symbols 440 Pulse shaping the serialized in phase and quadrature values of the plurality of transformed symbols 450 Scaling the plurality of transformed symbols by a scale factor to produce a plurality of scaled symbols 460 Limiting a magnitude of the plurality of scaled symbols to a limiting value 470 Frequency modulating a carrier signal by the plurality of scaled symbols to produce a frequency modulated signal 480 Frequency limiting the frequency modulated signal based upon a frequency mask 490 Transmitting the frequency modulated signal including modulating the frequency modulated signal onto a carrier signal

FIG. 4

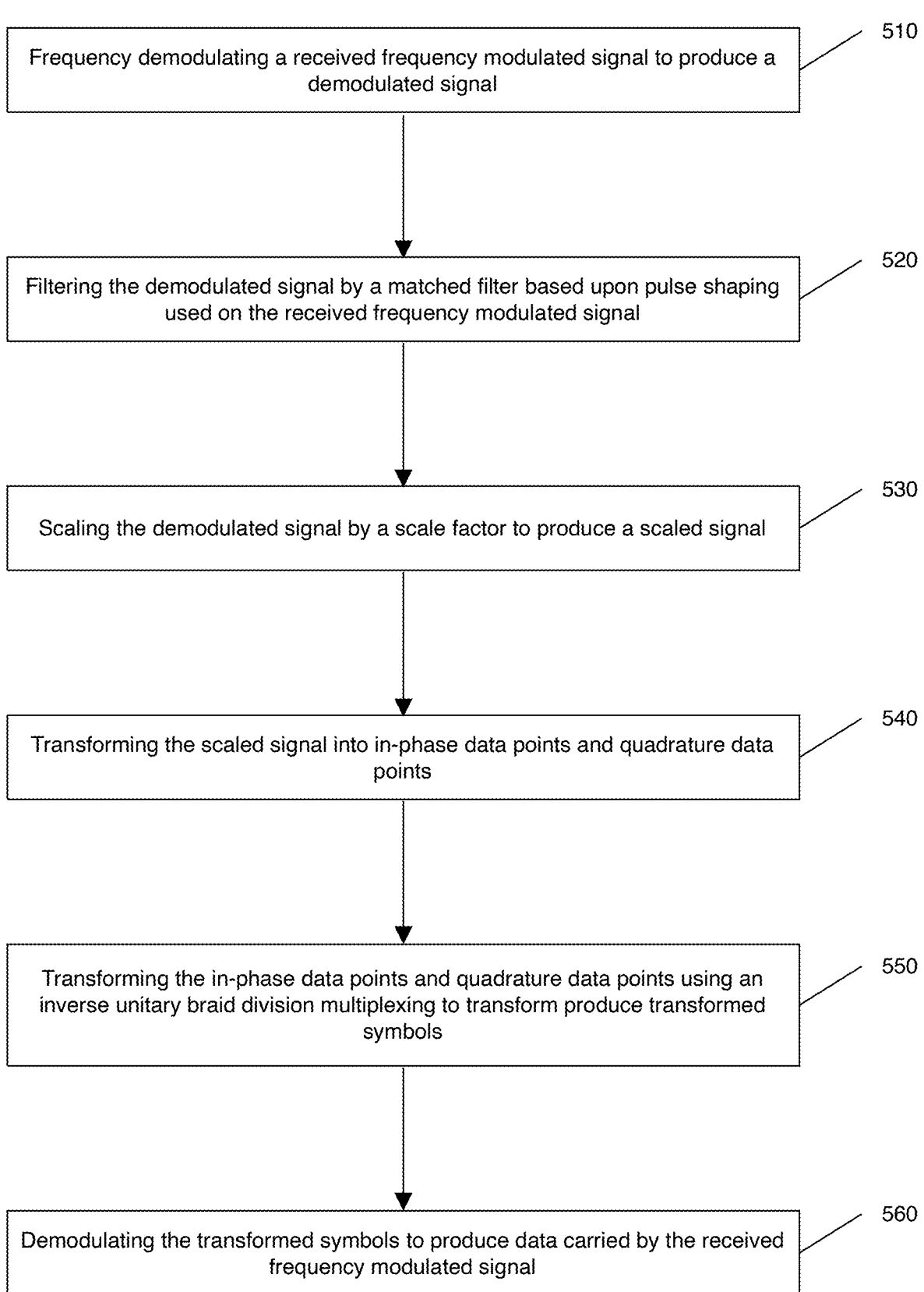

Frequency demodulating a received frequency modulated signal to produce a demodulated signal — 510

Filtering the demodulated signal by a matched filter based upon pulse shaping used on the received frequency modulated signal — 520

Scaling the demodulated signal by a scale factor to produce a scaled signal — 530

Transforming the scaled signal into in-phase data points and quadrature data points — 540

Transforming the in-phase data points and quadrature data points using an inverse unitary braid division multiplexing to transform produce transformed symbols — 550

Demodulating the transformed symbols to produce data carried by the received frequency modulated signal — 560

FIG. 5

CONSTANT ENVELOPE MODULATED UNITARY BRAID DIVISION MULTIPLEXING

TECHNICAL FIELD

The present disclosure relates to wireless networking, especially the application of unitary braid division multiplexing (UBDM) with constant envelope modulation communication systems, for example, frequency modulation (FM) communication systems.

BACKGROUND

At the physical layer of a wireless transmission, a wireless transmitter may encode multiple bits into a symbol by varying the magnitude/phase of the transmitted signal between predetermined values. For instance, the amplitude of two orthogonal signals may be manipulated to define multiple symbols according to their In-phase (I) and Quadrature (Q) components as I/Q points in a Quadrature Amplitude Modulation (QAM) encoding scheme. A constellation of a particular QAM encoding scheme defines the possible symbol values, and determines the number of bits conveyed per symbol. For example, a 16-QAM encoding scheme includes 16 predefined symbols at different I/Q points, with each symbol corresponding to a different set of four bits. These I/Q points may then be used with FM to transmit a signal over a communication channel that carries the information in the multiple bits.

BRIEF DESCRIPTION OF THE DRAWINGS

FIG. 4 is a flowchart of an example method for frequency modulating data symbols that have been UBDM transformed.

FIG. 5 is a flowchart of an example method for frequency demodulating data symbols that have been UBDM transformed.

DETAILED DESCRIPTION

Overview

Figure 1:
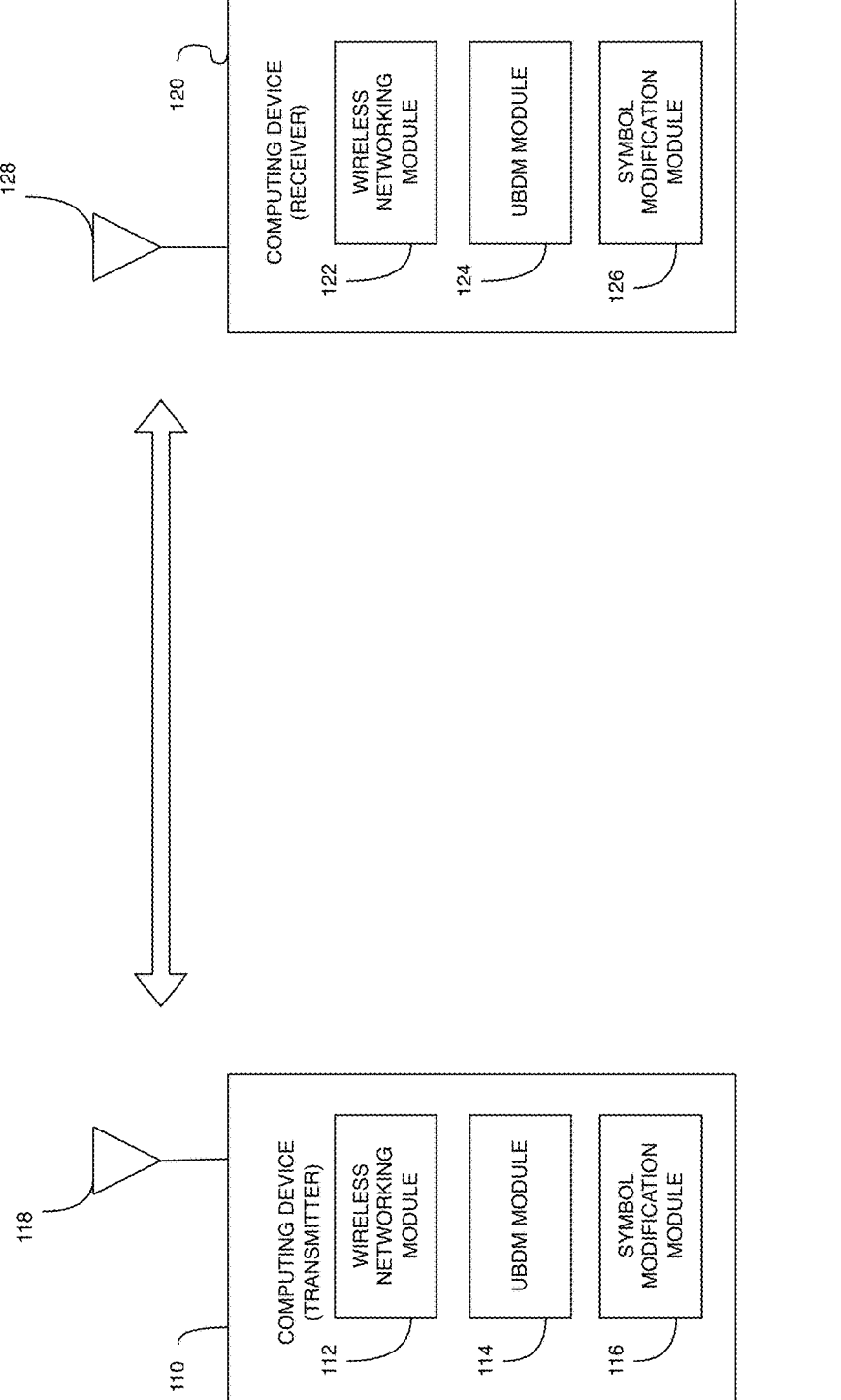
FIG. 1 is a simplified block diagram of a wireless network system configured to transmit a UBDM transformed signal using frequency modulation, according to an example embodiment.

A computer-implemented method is provided for mitigating the effect of nonlinearity in amplifiers of wireless devices. The method includes obtaining a plurality of symbols encoding data to transmit wirelessly, and then transmitting the plurality of symbols using constant envelope modulation, for example, frequency modulation (FM). Constant envelope modulation transmitters, such as FM transmitters, typically have a Peak to Average Power Ratio (PAPR) of 0 dB as measured at baseband. Such constant envelope signals have the benefit of low or fixed PAPR that allows for the use of nonlinear power amplifiers in radio communications. Further, many existing and future constant envelope systems will benefit from the use of UBDM.

Description of Embodiments

Before transmission, wireless devices typically use power amplifiers to amplify signals modulated by symbols. However, physical power amplifiers may introduce additional distortion and noise into the transmitted signal. For instance, a power amplifier may have a nonlinear gain function that increases the magnitude unequally and/or adds a phase distortion to the transmitted signal.

Additionally, the wireless receiver may only receive a fraction of the power transmitted by the wireless transmitter, leading the wireless receiver to further amplify the received signal. The amplifier in the wireless receiver is typically a low noise amplifier, but may also introduce additional nonlinear distortions that may interfere with recovering the data symbols from the wireless transmission. The wireless receiver may not accurately decode the transmitted symbol if the distortion introduced by the amplifier(s) exceeds a certain threshold. The use of constant envelope modulation decreases the effects of these non-linearities of the transmitter and receiver on the performance of the communication system because constant envelope modulation has a low PAPR.

An embodiment will be described using FM with UBDM to illustrate the use of a constant envelope modulation with UBDM, but other types of constant envelope modulations may be used with UBDM as well. A few examples of other constant envelope modulation techniques include Minimum-Shift Keying (MSK), Gaussian Minimum-Shift Keying (GMSK), Filtered Quadrature Shift Keying (FQPSK), and Shaped-Offset Quadrature Shift Keying (SOQPSK). FM systems vary the frequency of a signal in order to modulate information onto the sinusoidal signal. Accordingly, the peak value of the input information or data affects the peak frequency variation for the frequency modulation. Radio communication signals generally adhere to bandwidth requirements to avoid interference with other signals in the spectrum and to conform with government regulations regarding the use of radio frequency spectrum.

Digital data may be encoded on symbols that may be transmitted using modulation. In some examples, a wireless receiver may be able to recover data from a noisy/distorted signal based on the encoding format (e.g., the constellation of symbols) of the wireless transmission. For instance, a first constellation (e.g., 4-QAM) may have predefined symbols with a larger separation on average than a second constellation (e.g., 256-QAM). The larger separation of the first constellation may allow the wireless receiver to recover data from a noisier wireless transmission than the second constellation would allow. The second constellation transmits more bits of data per symbol but will be more sensitive to noise and distortion.

UBDM is a digital baseband transform, operating at the physical layer, that encapsulates and secures all information-bearing content of a waveform. With UBDM, unintended recipients can not listen in, inject, or modify traffic, or even conclusively identify the intended communicants for a transmission. In other words, UBDM offers a complete solution to prevent attacks from wireless eavesdroppers.

UBDM transforms (plaintext) complex baseband I/Q symbols into different (ciphertext) complex baseband I/Q symbols, much like a traditional symmetric cryptologic transforms plain bits into cipher bits. The new cipher I/Q symbols are then transmitted exactly as the plain I/Q symbols would have been transmitted.

In traditional encryption, the plain/data bits are transformed into cipher bits that look random, removing any structure from the plain bits. In its simplest form, UBDM encrypts the I/Q data and the resulting cipher is Gaussian random but other types of randomness may be used as well. The Gaussian structure was chosen for the following reasons: first, to most closely resemble the background thermal noise; second, to minimize Fisher Information; and third, to maximize the Shannon Entropy. This combination provides the strongest degree of cryptographic and information theoretic security.

The UBDM transform may include the use of various unitary matrices. The UBDM transform may include arbitrary transformations including unitary transformations, equiangular tight frame (ETF) transformations, and/or nearly equiangular tight frame (NETF) transformations. The UBDM transform may be implemented using a plurality of layers, wherein the plurality of layers includes, linear layers, nonlinear layers, or a combination of linear and nonlinear layers. Various techniques may be used to speed up the computation of the UBDM transforms. Further, random bits and/or cryptographically generated bits may be used in the UBDM transforms and may result in the UBDM transform being arbitrary and hence appearing random to an observer of the communications. Hence, the UBDM transform can lead to the secure communications carried out using the UBDM transform.

The UBDM transform may be implemented in various ways including, for example, those disclosed in the following U.S. patents, all of which are hereby incorporated by reference for all purposes as if included herein: U.S. Pat. No. 10,020,839 "Reliable orthogonal spreading codes in wireless communications;" U.S. Pat. No. 11,641,269 "Modulation-agnostic transformations using unitary braid divisional multiplexing (UBDM);" and U.S. Pat. No. 11,936,770 "Automorphic transformations of signal samples within a transmitter or receiver."

The techniques presented herein modify the distribution of the symbols in the I/Q plane to reduce and limit the frequency deviations required to modulate the symbols in the I/Q plane. In one example, the symbols in the I/Q plane may be scaled. In another example, the symbols in the I/Q plane are limited. In yet another example, the symbols in the I/Q plane may both be scaled and limited.

Referring now to FIG. 1, a simplified block diagram illustrates an example of a network system 100 configured to communicate information securely between computing devices. The network system 100 includes a computing device 110, which may also be referred to herein as a transmitter device. The computing device 110 includes a wireless networking module 112 that enables the computing device 110 to process communications signals and exchange information with other computing devices over a wireless network. The computing device 110 also includes a UBDM module 114 that enables the computing device 110 to encode and decode a constellation of predefined symbols using a UBDM transform. The computing device 110 includes a symbol modification module 116 that enables the computing device 110 to modify the symbol characteristics of a wireless transmission by scaling and/or limiting the symbols according to the techniques described herein. The computing device 110 may further include an antenna 118 that enables the computing device 110 to transmit/receive wireless signals to/from other computing devices.

The network system 100 includes a computing device 120, which may also be referred to herein as a receiver device. The computing device 120 includes a wireless networking module 122 that enables the computing device 120 to process communications signals and exchange information with other computing devices over a wireless network. The computing device 120 also includes a UBDM module 124 that enables the computing device 120 to encode and decode a constellation of predefined symbols using a UBDM transform. The computing device 120 includes a symbol modification module 126 that enables the computing device 120 to modify the symbol characteristics of a wireless transmission by scaling and/or limiting the symbols according to the techniques described herein. The computing device 120 may further include an antenna 128 that enables the computing device 120 to transmit/receive wireless signals to/from other computing devices.

In one example, the computing device 110 and/or computing device 120 may be embodied in a laptop computer, a desktop computer, a server, a network device, an Internet of Things (IoT) device, a mobile phone, a radio, any other wireless device, or an accessory device to any of the preceding devices. The computing devices 110 and 120 may be integrated into larger computing systems, such as a data center or cloud computing environment.

In another example, the wireless networking module 112 and the wireless networking module 122 may further include a software defined radio that enables the computing device 110 and the computing device 120, respectively, to adjust the parameters (e.g., frequency, amplitude, power, timing, etc.) of the wireless signals transmitted via the antenna 118 and the antenna 128.

In a further example, the computing device 110 and the computing device 120 may communicate via a computer network, such as a Local Area Network (LAN), a Wide Area Network (WAN), a private network, a Virtual Private Network (VPN), a Metropolitan Area Network (MAN), a Personal Area Network (PAN), a Wireless LAN (WLAN), a Wireless WAN (WWAN), a cellular network, and/or combinations thereof. The computer network between the computing device 110 and the computing device 120 may include segments over wired and/or wireless channels, such as Radio Frequency (RF) channels, Extremely Low Frequency (ELF) channels, Ultra Low Frequency (ULF) channels, Low Frequency (LF) channels, Medium Frequency (MF) channels, High Frequency (HF) channels, Very High Frequency (VHF) channels, Ultra High Frequency (UHF) channels, Extremely High Frequency (EHF) channels, and/or satellite channels. The computer network between the computing device 110 and the computing device 120 may also include one or more segments over optical networks (e.g., based on Synchronous Optical Networking (SONET), Synchronous Digital Hierarchy (SDH), or Optical Transport Network (OTN) protocols).

Figure 2:
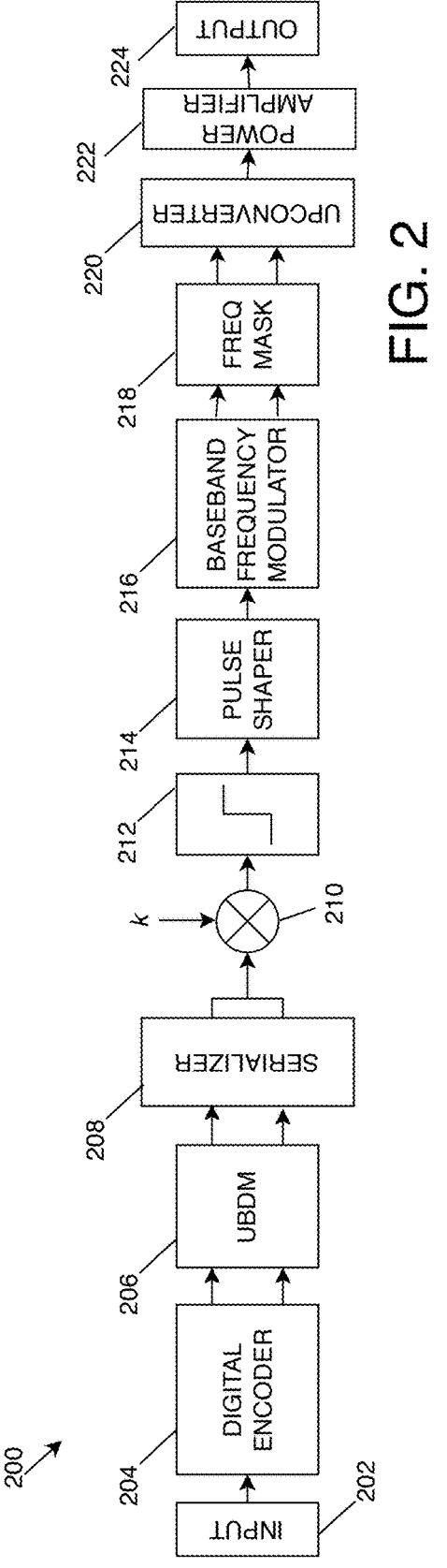
FIG. 2 illustrates a block diagram of a transmitter that uses a UBDM transform and frequency modulation.

FIG. 2 illustrates a block diagram of a transmitter 200 that uses a UBDM transform and frequency modulation. The transmitter 200 receives input data 202 to be communicated. The input data 202 may be, for example, digital data represented as binary digits, but other formats may be used as well that are able to be transformed into symbols. The input data 202 is fed into a digital encoder 204. The digital encoder 204 converts input data to output symbols. The digital encoder 204 may implement, for example, phase-shift keying (PSK), quadrature amplitude modulation (QAM), amplitude and phase-shift keying (APSK), pulse amplitude modulation (PAM), etc. The output symbols may be, for example, constellation points on a complex plane.

The constellation points or in-phase and quadrature (I/Q) points are then input into the UBDM transform 206. The UBDM transform 206 transforms received I/Q points and produces I/Q outputs that are in random positions on the complex plane as seen by an external observer. The UBDM transform 206 may use a key to carry out the transform of the received I/Q points, and a receiver may use the key and an inverse UBDM transform to recover the received I/Q points and hence the input data 202. A serializer 208 takes the I/Q outputs of the UBDM transform 206 and produces a serial stream of real numbers based upon the in-phase and quadrature components of the I/Q outputs of the UBDM transform 206.

The serialized data output from the serializer 208 is then scaled by a scale factor k using a multiplier 210. The scale factor k is selected to scale the serialized data into a range of data that will reduce the magnitude of the frequency variation that results when the data is used for frequency modulation. This scaling operation is needed because of the nature of the UBDM transform 206. The digital encoder 204 produces I/Q points that are at known fixed locations. As a result, the values derived from the I/Q points used to do the frequency modulation have known values that may be selected in order to satisfy the frequency variation limits of the frequency modulation. The UBDM transform 206 transforms the I/Q points from the digital encoder 204 to a random distribution of points. This random distribution in some situations may be Gaussian in nature. As a result, the maximum magnitude of the values of the I and Q components of the I/Q points is not limited. The probability that larger I or Q components may result from the UBDM transform 206 typically decreases as the magnitude of the I or Q components increase. Accordingly, the scaling operation is used to reduce the magnitude of the frequency deviation resulting from modulating the outputs of the UBDM transform 206. The scale factor may be a fixed value k as described above. In other embodiments, the scale factor may vary depending upon the values to be scaled using a linear or nonlinear scaling function or a look up table. In yet another embodiment, the multiplier 210 and scale factor k may be replaced by a scaling function or lookup table that produces output values based upon input values. As a result, the serialized data output from the serializer 208 may be scaled in a variety of ways.

Further, the outputs of the multiplier 210 may be limited by a limiter 212. The limiter 212 has a limiting value that limits any values that exceed the limiting value to the limiting value. The limiting value is selected based upon the maximum allowed frequency variation allowed for the frequency modulation. This value is typically set by government regulations based upon the specific frequency bands used. The use of the multiplier 210 and scaling factor k is a hard limiter. In other embodiments, a soft limiter might be used instead of a hard limiter. Soft limiters may be based on a sigmoid, logarithmic, hyperbolic tangent, or other nonlinear function.

The output of the limiter 212 is then input into a pulse shaper 214. The pulse shaper 214 produces a shaped pulse based upon channel characteristics and results in a specific matched filter to be used in the receiver to detect the transmitted signal. A baseband frequency modulator 216 frequency modulates the output of the pulse shaper 214 onto a carrier sinusoid signal. The baseband frequency modulator 216 may be implemented using various known means and may be implemented digitally (as is the case in the example of FIG. 2) or analog (for example, when the output of the pulse shaper 214 is an analog signal). In other embodiments the baseband frequency modulator 216 may be implemented using frequency-shift keying modulation. A frequency mask 218 is applied to the output of the baseband frequency modulator 216 in order to frequency-limit the FM signal. This is done to prevent interference with other signals and to conform with government regulations. The frequency mask 218 typically will be a bandpass filter with a sharp enough cutoff frequencies to meet the interference and regulatory requirements. The output of the frequency mask 218 is then modulated onto a carrier signal by the upconverter 220. A power amplifier 222 then amplifies the modulated carrier signal. This power amplifier 222 may introduce nonlinearities as discussed above. When FM is used, the linearity requirements of the power amplifier 222 may be reduced, and this is one reason that FM may be used in a communication system. The power amplifier 222 outputs the frequency modulated signal that will become the FM output signal 224. The upconverter 220 may use an amplitude modulation to mix the output of the frequency mask 218 up to the carrier frequency.

While both a multiplier 210 implementing scaling and a limiter 212 are illustrated, in some embodiments only the multiplier 210 will be used to scale the outputs of the serializer 208 without the limiter 212. In yet other embodiments, only the limiter 212 will be used to limit the outputs of the serializer 208 without the multiplier 210.

In yet another embodiment, the scaling by the multiplier 210 and/or the limiting by the limiter 212 may be applied directly to the I/Q outputs of the UBDM transform 206. This may be done by applying the scaling or limiting to the I component and Q component of the I/Q output individually or to the magnitude of the I/Q outputs. Likewise, the limiting may be applied to the I component and the Q component of the I/Q output individually resulting in a square shaped limiting. On the other hand, the limiting may be applied to the magnitude of the I/Q outputs resulting in a circular shaped limiting.

After scaling and/or limiting the I/Q outputs of the UBDM transform 206, the I/Q outputs may then be serialized before being input into the pulse shaper 214. In other embodiments, the pulse shaper 214 may instead receive I/Q values rather than real values and output an angle value that is then fed into the baseband frequency modulator 216.

FIG. 2 illustrates a largely digital implementation of the transmitter 200. In the transmitter 200, a digital-to-analog converter (DAC) may be implemented as part of the upconverter 220. In other embodiments a DAC may be implemented between the pulse shaper 214 and the baseband frequency modulator 216. In that case, the baseband frequency modulator 216, frequency mask 218, and upconverter 220 all receive and produce analog signals leading to analog implementations of those elements. In yet other embodiments, the DAC may be implemented any place after the UBDM transform 206 resulting in the appropriate elements of transmitter 200 to be analog implementations instead of digital implementations.

Figure 3:
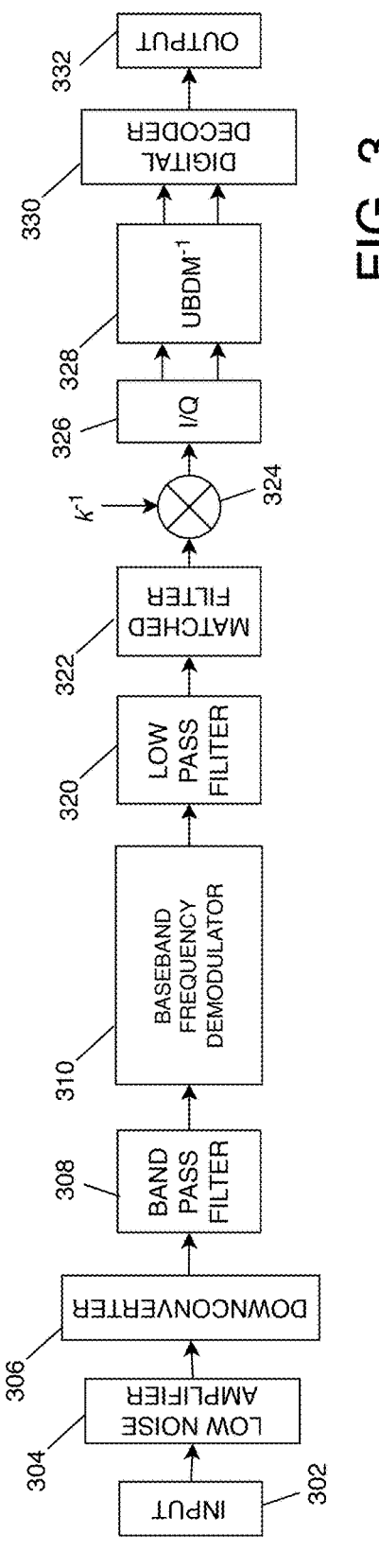
FIG. 3 illustrates a block diagram of a receiver that receives frequency modulated signals that include UBDM transformed symbols.

FIG. 3 illustrates a block diagram of a receiver 300 that receives frequency modulated signals that include UBDM transformed symbols. The receiver 300 receives an input radio frequency signal 302 that is frequency modulated. A low noise amplifier 304 amplifies the received input radio frequency signal 302. A low noise amplifier 304 amplifies the received input radio frequency signal 302. The low noise amplifier 304 may introduce nonlinearities as discussed above. When FM is used, the linearity requirements of the received input radio frequency signal 302 may be reduced, and this is one reason that FM may be used in a communication system. A downconverter 306 may mix the frequency modulated input radio frequency signal 302 down to an intermediate carrier frequency. A band pass filter 308 filters the output of the downconverter 306 to remove extraneous signals. A baseband frequency demodulator 310 receives the output of the band pass filter 308 and frequency demodulates the received signal. The baseband frequency demodulator 310 may be implemented using various known implementations. A low pass filter 320 filters the output of the baseband frequency demodulator 310. A matched filter 322 is used to detect the presence of data symbols in the demodulated signal. The output of the matched filter 322 is scaled by k−1 using a multiplier 324. This is to invert the scaling by k applied by the transmitter 200. The scale factor may be a fixed value k−1 as described above. In other embodiments, the scale factor may vary depending upon the values to be scaled using a scaling function that may be linear or nonlinear or a look up table. In yet another embodiment, the multiplier 324 and scale factor k−1 may be replaced by a scaling function or lookup table that produces output values based upon input values. As a result, the output from the matched filter 322 may be scaled in a variety of ways. The output of the multiplier 324 is converted into I and Q components by an I/Q circuit 326. It is noted that the order of the multiplier 324 and I/Q circuit 326 may be swapped. An inverse UBDM transform 328 is then performed on the I and Q data output by the I/Q circuit 326. The inverse UBDM transform 328 reverses the UBDM transform 206 applied to the data symbols in the transmitter 200. A digital decoder 330 then converts the symbols output by the inverse UBDM transform 328 back to output data 332 that corresponds to the input data 202 received by the transmitter 200.

FIG. 3 illustrates a largely digital implementation of the receiver 300. In the receiver 300, an analog-to-digital converter (ADC) may be implemented as part of the downconverter 306. In other embodiments, an ADC may be implemented between the angle detector 318 and the low pass filter 320. In that case the downconverter 306 and filter 308 both receive and produce analog signals leading to analog implementations of those elements. In yet other embodiments, the ADC may be implemented any place after the downconverter 306 resulting in the appropriate elements of receiver 300 to be analog implementations instead of digital implementations.

FIG. 4 is a flowchart of an example method 400 for frequency modulating data symbols that have been UBDM transformed. At step 410, the method 400 receives a plurality of symbols encoding data to transmit wirelessly. At step 420, the method 400 transforms the plurality of symbols using a unitary braid division multiplexing transform to produce a plurality of transformed symbols including in-phase and quadrature values. At step 430, the method 400 serializes the in-phase and quadrature values of the plurality of transformed symbols. At step 440, the method 400 pulse shapes the serialized in-phase and quadrature values of the plurality of transformed symbols. At step 450, the method 400 scales the plurality of transformed symbols, using, for example, a scale factor to produce a plurality of scaled symbols. At step 460, the method 400 limits a magnitude of the plurality of scaled symbols. It is noted that only step 450 and not step 460 may also be carried out or only step 460 and not step 450 may be carried out. At step 470, the method 400 frequency modulates a carrier signal by the plurality of scaled symbols to produce a frequency modulated signal. At step 480, the method 400 frequency limits the frequency modulated signal based upon a frequency mask. At step 490, the method 400 transmits the frequency modulated signal including modulating the frequency modulated signal onto a carrier signal.

FIG. 5 is a flowchart of an example method 500 for frequency demodulating data symbols that have been UBDM transformed. At step 510, the method 500 frequency demodulates a received frequency modulated signal to produce a demodulated signal. At step 520, the method 500 filters the demodulated signal by a matched filter based upon pulse shaping used on the received frequency modulated signal. At step 530, the method 500 scales the demodulated signal to produce a scaled signal. At step 540, the method 500 transforms the scaled signal into in-phase data points and quadrature data points. At step 550, the method 500 transforms the in-phase data points and quadrature data points using an inverse unitary braid division multiplexing transform to produce transformed symbols. At step 560, the method 500 demodulates the transformed symbols to produce data carried by the received frequency modulated signal.

Note that while the systems and methods described in FIGS. 2-4 use FM, other constant envelope modulations may be used with UBDM instead.

Figure 6:
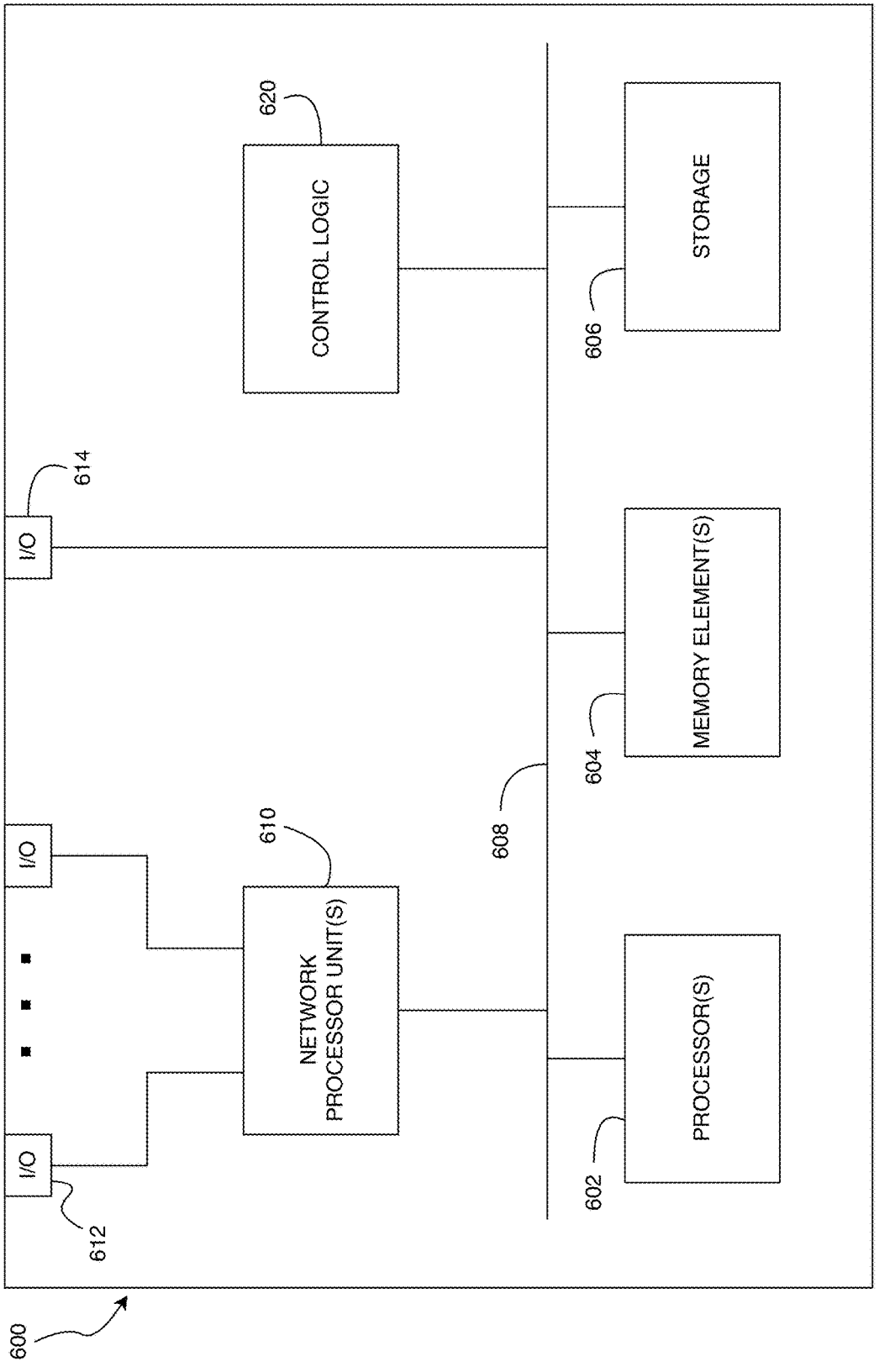
FIG. 6 illustrates a hardware block diagram that depicts a computing device that may perform functions associated with operations described herein in connection with the techniques depicted in FIGS. 1, 2, 3, 4, and 5.

Referring now to FIG. 6, a hardware block diagram depicts a computing device 600 that may perform functions associated with operations described herein in connection with the techniques depicted in FIGS. 1, 2, 3, 4, and 5. In various embodiments, a computing device, such as computing device 600 or any combination of computing devices 600, may be configured as any entity/entities as discussed for the techniques depicted in connection with FIGS. 1, 2, 3, 4, and 5, in order to perform operations of the various techniques discussed herein. In some instances, one or more computing devices 600 (e.g., wireless transmitters, wireless receivers) may be deployed in a cloud or distributed computing environment to perform one or more of the techniques described herein.

In at least one embodiment, the computing device 600 may include one or more processor(s) 602, one or more memory element(s) 604, storage 606, a communication bus 608, one or more network processor unit(s) 610 interconnected with one or more network input/output (I/O) interface(s) 612, and control logic 620. In various embodiments, instructions associated with logic for computing device 600 may overlap in any manner and are not limited to the specific allocation and/or operations described herein.

In at least one embodiment, processor(s) 602 is/are at least one hardware processor configured to execute various tasks, operations, and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information, etc.) from one state or thing to another state or thing. Any of potential processing elements, microprocessors, digital signal processors, floating point gate arrays (FPGAs), graphical processor units (GPUs), secure processors, baseband signal processors, modems, PHY elements, controllers, systems, managers, logic, and/or machines described herein can be construed as being encompassed within the broad term 'processor.'

In at least one embodiment, memory element(s) 604 and/or storage 606 is/are configured to store data, information, software, and/or instructions associated with computing device 600, and/or logic configured for memory element (s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, communication bus 608 can be configured as an interface that enables one or more elements of computing device 600 to communicate in order to exchange information and/or data. Communication bus 608 can be implemented with any architecture designed for passing control, data, and/or information between processors, memory elements/storage, peripheral devices, and/or any other hardware and/or software components that may be configured for computing device 600. In at least one embodiment, communication bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface card(s), optical (e.g., Fibre Channel) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc., to facilitate operations for various embodiments described herein. In various embodiments, network I/O interface(s) 612 can be configured as one or more Ethernet port(s), Fibre Channel port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, touch screen, microphone or microphone array, camera, video capture device, and/or other suitable input and/or output device now known or hereafter developed. In some instances, external devices may also include portable computer readable (non-transitory) storage media such as database systems, flash memory drives, portable optical or magnetic disks, and/or other memory cards. In some instances, external devices may include a mechanism to display data to a user, such as a computer monitor, a display screen, an audio speaker, and/or other output device.

In various embodiments, control logic 620, can include instructions that, when executed, cause processor(s) 602 to perform operations, which can include, but not be limited to, providing overall control operations of computing devices; interacting with other entities, systems, etc., described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), secure memory module, tamper-proof memory, application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure; all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in an Application Specific Integrated Circuit (ASIC), Digital Signal Processing (DSP) instructions, software (potentially inclusive of object code and/or source code), etc.) for execution by one or more processor(s), and/or other similar machines. Generally, memory element(s) 604 and/or storage 606 may store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, and/or the like that are executed to carry out operations in accordance with the teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, flash drives, and/or smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium.

Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/6G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein apply scaling and limiting operations to data encoded in symbols for frequency modulated wireless transmission. The operations modify the data symbols to limit the frequency variation of the frequency modulated signal in order to mitigate interference with other signals and to satisfy regulatory requirements.

In some aspects, the techniques described herein relate to a method including: obtaining a plurality of symbols encoding data to transmit wirelessly; transforming the plurality of symbols using a unitary braid division multiplexing transform to produce a plurality of transformed symbols; scaling the plurality of transformed symbols produce a plurality of scaled symbols; modulating a carrier signal by the plurality of scaled symbols to produce a constant envelope signal; and transmitting the modulated signal.

In some aspects, the techniques described herein relate to a method, further including limiting a magnitude of the plurality of scaled symbols.

In some aspects, the techniques described herein relate to a method, wherein modulating the carrier signal uses frequency modulation.

In some aspects, the techniques described herein relate to a method, wherein the plurality of transformed symbols includes in-phase and quadrature values and further including serializing the in-phase and quadrature values of the plurality of transformed symbols.

In some aspects, the techniques described herein relate to a method, further including pulse shaping the in-phase and quadrature values of the plurality of transformed symbols.

In some aspects, the techniques described herein relate to a method, further including frequency limiting the modulated signal based upon a frequency mask.

In some aspects, the techniques described herein relate to a method, wherein transmitting the modulated signal includes modulating the modulated signal onto a carrier signal.

In some aspects, the techniques described herein relate to a method, wherein plurality of symbols encoding data are encoded using one of phase-shift keying, quadrature amplitude modulation, amplitude and phase-shift keying, or pulse amplitude modulation.

In some aspects, the techniques described herein relate to an apparatus including: a wireless transmitter configured to transmit wireless signals; and a processor configured to: obtain a plurality of symbols encoding data to transmit wirelessly; transform the plurality of symbols using a unitary braid division multiplex transform to produce a plurality of transformed symbols; scale the plurality of transformed symbols to produce a plurality of scaled symbols; modulate a carrier signal by the plurality of scaled symbols to produce a constant envelope signal; and cause the wireless transmitter to transmit the modulated signal.

In some aspects, the techniques described herein relate to an apparatus, wherein the processor is further configured to limit a magnitude of the plurality of scaled symbols.

In some aspects, the techniques described herein relate to an apparatus, wherein modulating the carrier signal uses frequency modulation.

In some aspects, the techniques described herein relate to an apparatus, wherein the plurality of transformed symbols includes in-phase and quadrature values and further including serializing the in-phase and quadrature values of the plurality of transformed symbols.

In some aspects, the techniques described herein relate to an apparatus, wherein the processor is further configured to further including pulse shaping the in-phase and quadrature values of the plurality of transformed symbols.

In some aspects, the techniques described herein relate to an apparatus, wherein the processor is further configured to frequency limit the modulated signal based upon a frequency mask.

In some aspects, the techniques described herein relate to an apparatus, wherein the wireless transmitter is configured to transmit the modulated signal by modulating the modulated signal onto a carrier signal.

In some aspects, the techniques described herein relate to an apparatus, wherein plurality of symbols encoding data are encoded using one of phase-shift keying, quadrature amplitude modulation, amplitude and phase-shift keying, or pulse amplitude modulation.

In some aspects, the techniques described herein relate to one or more non-transitory computer readable storage media encoded with software including computer executable instructions and, when the software is executed on a processor of a transmitter device, operable to cause the processor to: obtain a plurality of symbols encoding data to transmit wirelessly; transform the plurality of symbols using a unitary braid division multiplexing transform to produce a plurality of transformed symbols; scale the plurality of transformed symbols to produce a plurality of scaled symbols; modulate a carrier signal by the plurality of scaled symbols to produce a constant envelope signal; and transmit the modulated signal.

In some aspects, the techniques described herein relate to one or more non-transitory computer readable storage media, wherein the computer executable instructions further cause the processor to limit a magnitude of the plurality of scaled symbols.

In some aspects, the techniques described herein relate to one or more non-transitory computer readable storage media, wherein modulating the carrier signal uses frequency modulation.

In some aspects, the techniques described herein relate to one or more non-transitory computer readable storage media, wherein the plurality of transformed symbols includes in-phase and quadrature values and further including serializing the in-phase and quadrature values of the plurality of transformed symbols.

In some aspects, the techniques described herein relate to one or more non-transitory computer readable storage media, wherein the computer executable instructions further cause the processor to pulse shape the in-phase and quadrature values of the plurality of transformed symbols.

In some aspects, the techniques described herein relate to one or more non-transitory computer readable storage media, wherein the computer executable instructions further cause the processor to frequency limit the modulated signal based upon a frequency mask.

In some aspects, the techniques described herein relate to one or more non-transitory computer readable storage media, wherein transmitting the modulated signal includes upconverting the modulated signal onto a carrier signal.

In some aspects, the techniques described herein relate to one or more non-transitory computer readable storage media, wherein plurality of symbols encoding data are encoded using one of phase-shift keying, quadrature amplitude modulation, amplitude and phase-shift keying, or pulse amplitude modulation.

In some aspects, the techniques described herein relate to a method including: demodulating a received constant envelope signal to produce a demodulated signal; scaling the demodulated signal to produce a scaled signal; transforming the scaled signal into in-phase data points and quadrature data points; transforming the in-phase data points and quadrature data points using an inverse unitary braid division multiplexing transform to produce transformed symbols; and decoding the transformed symbols to produce data carried by the received constant envelope signal.

In some aspects, the techniques described herein relate to a method, further including filtering the demodulated signal by a matched filter based upon pulse shaping used on the received constant envelope signal.

In some aspects, the techniques described herein relate to a method, wherein demodulating the received constant envelop signal uses frequency modulation.

In some aspects, the techniques described herein relate to a method, wherein demodulating the transformed symbols includes using one of phase-shift keying, quadrature amplitude modulation, amplitude and phase-shift keying, or pulse amplitude modulation.

In some aspects, the techniques described herein relate to an apparatus including: a wireless receiver configured to receive wireless signals; and a processor configured to: demodulate a received constant envelope modulated signal to produce a demodulated signal; scale the demodulated signal to produce a scaled signal; transform the scaled signal into in-phase data points and quadrature data points; transform the in-phase data points and quadrature data points using an inverse unitary braid division multiplexing transform to produce transformed symbols; and decode the transformed symbols to produce data carried by the received modulated signal.

In some aspects, the techniques described herein relate to an apparatus, wherein the processor is further configured to filter the demodulated signal by a matched filter based upon pulse shaping used on the received modulated signal.

In some aspects, the techniques described herein relate to an apparatus, wherein demodulating the received constant envelope signal uses frequency modulation.

In some aspects, the techniques described herein relate to an apparatus, wherein demodulating the transformed symbols includes using one of phase-shift keying quadrature amplitude modulation, amplitude and phase-shift keying, or pulse amplitude modulation.

In some aspects, the techniques described herein relate to one or more non-transitory computer readable storage media encoded with software including computer executable instructions and, when the software is executed on a processor of a transmitter device, operable to cause the processor to: demodulate a received constant envelope modulated signal to produce a demodulated signal; scale the demodulated signal to produce a scaled signal; transform the scaled signal into in-phase data points and quadrature data points; transform the in-phase data points and quadrature data points using an inverse unitary braid division multiplexing transform to produce transformed symbols; and decode the transformed symbols to produce data carried by the received modulated signal.

In some aspects, the techniques described herein relate to one or more non-transitory computer readable storage media, wherein the computer executable instructions further cause the processor to filter the demodulated signal by a matched filter based upon pulse shaping used on the received modulated signal.

In some aspects, the techniques described herein relate to one or more non-transitory computer readable storage media, wherein demodulating the received constant envelope signal uses frequency modulation.

In some aspects, the techniques described herein relate to one or more non-transitory computer readable storage media, wherein demodulating the transformed symbols includes using one of phase-shift keying, quadrature amplitude modulation, amplitude and phase-shift keying, or pulse amplitude modulation.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining a plurality of symbols encoding data to transmit wirelessly;
transforming the plurality of symbols using a unitary braid division multiplexing transform to produce a plurality of transformed symbols, the unitary braid division multiplexing transform being implemented using one or more layers of linear transformations and one or more layers of nonlinear transformations;
scaling the plurality of transformed symbols produce a plurality of scaled symbols;
modulating a carrier signal by the plurality of scaled symbols to produce a constant envelope signal; and
transmitting the constant envelope signal.

2. The method of claim 1, further comprising limiting a magnitude of the plurality of scaled symbols.

3. The method of claim 1, wherein modulating the carrier signal uses frequency modulation.

4. The method of claim 1, wherein the plurality of transformed symbols includes in-phase and quadrature values and further comprising serializing the in-phase and quadrature values of the plurality of transformed symbols.

5. The method of claim 4, further comprising pulse shaping the in-phase and quadrature values of the plurality of transformed symbols.

6. The method of claim 1, further comprising frequency limiting the constant envelope signal based upon a frequency mask.

7. The method of claim 1, wherein transmitting the constant envelope signal includes upconverting the constant envelope signal onto a carrier signal.

8. The method of claim 1, wherein plurality of symbols encoding data are encoded using one of phase-shift keying, quadrature amplitude modulation, amplitude and phase-shift keying, or pulse amplitude modulation.

9. An apparatus comprising:
a wireless transmitter configured to transmit wireless signals; and
a processor configured to:
obtain a plurality of symbols encoding data to transmit wirelessly;
transform the plurality of symbols using a unitary braid division multiplexing transform to produce a plurality of transformed symbols, the unitary braid division multiplexing transform being implemented using one or more layers of linear transformations and one or more layers of nonlinear transformations;
scale the plurality of transformed symbols to produce a plurality of scaled symbols;
modulate a carrier signal by the plurality of scaled symbols to produce a constant envelope signal; and
cause the wireless transmitter to transmit the constant envelope signal.

10. The apparatus of claim 9, wherein the processor is further configured to limit a magnitude of the plurality of scaled symbols.

11. The apparatus of claim 9, wherein modulating the carrier signal uses frequency modulation.

12. The apparatus of claim 9, wherein the plurality of transformed symbols includes in-phase and quadrature values and further comprising serializing the in-phase and quadrature values of the plurality of transformed symbols.

13. The apparatus of claim 12, wherein the processor is further configured to further comprising pulse shaping the in-phase and quadrature values of the plurality of transformed symbols.

14. The apparatus of claim 9, wherein the processor is further configured to frequency limit the constant envelope signal based upon a frequency mask.

15. The apparatus of claim 9, wherein the wireless transmitter is configured to transmit the constant envelope signal by upconverting the constant envelope signal onto a carrier signal.

16. The apparatus of claim 9, wherein plurality of symbols encoding data are encoded using one of phase-shift keying, quadrature amplitude modulation, amplitude and phase-shift keying, or pulse amplitude modulation.

17. One or more non-transitory computer readable storage media encoded with software comprising computer executable instructions and, when the software is executed on a processor of a transmitter device, operable to cause the processor to:

obtain a plurality of symbols encoding data to transmit wirelessly;

transform the plurality of symbols using a unitary braid division multiplexing transform to produce a plurality of transformed symbols, the unitary braid division multiplexing transform being implemented using one or more layers of linear transformations and one or more layers of nonlinear transformations;

scale the plurality of transformed symbols to produce a plurality of scaled symbols;

modulate a carrier signal by the plurality of scaled symbols to produce a constant envelope signal; and transmit the constant envelope signal.

18. The one or more non-transitory computer readable storage media of claim 17, wherein the computer executable instructions further cause the processor to limit a magnitude of the plurality of scaled symbols.

19. The one or more non-transitory computer readable storage media of claim 17, wherein modulating the carrier signal uses frequency modulation.

20. The one or more non-transitory computer readable storage media of claim 17, wherein the plurality of transformed symbols includes in-phase and quadrature values and further comprising serializing the in-phase and quadrature values of the plurality of transformed symbols.

21. The one or more non-transitory computer readable storage media of claim 20, wherein the computer executable instructions further cause the processor to pulse shape the in-phase and quadrature values of the plurality of transformed symbols.

22. The one or more non-transitory computer readable storage media of claim 17, wherein the computer executable instructions further cause the processor to frequency limit the constant envelope signal based upon a frequency mask.

23. The one or more non-transitory computer readable storage media of claim 17, wherein transmitting the constant envelope signal includes upconverting the constant envelope signal onto a carrier signal.

24. The one or more non-transitory computer readable storage media of claim 17, wherein plurality of symbols encoding data are encoded using one of phase-shift keying, quadrature amplitude modulation, amplitude and phase-shift keying, or pulse amplitude modulation.

* * * * *